(12) United States Patent
Mortimore

(10) Patent No.: US 9,237,156 B2
(45) Date of Patent: Jan. 12, 2016

(54) SYSTEMS AND METHODS FOR ADMINISTRATING ACCESS IN AN ON-DEMAND COMPUTING ENVIRONMENT

(71) Applicant: salesforce.com, inc., San Francisco, CA (US)

(72) Inventor: Chuck Mortimore, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/889,060

(22) Filed: May 7, 2013

(65) Prior Publication Data
US 2013/0312068 A1    Nov. 21, 2013

Related U.S. Application Data

(60) Provisional application No. 61/649,540, filed on May 21, 2012.

(51) Int. Cl.
*H04L 29/06* (2006.01)

(52) U.S. Cl.
CPC .................................... *H04L 63/10* (2013.01)

(58) Field of Classification Search
CPC combination set(s) only.
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

OTHER PUBLICATIONS

Bottoni et al., Credentials and Beliefs in Remote Trusted Platforms Attestation, © 2006, IEEE, 6 pages.*

(Continued)

*Primary Examiner* — Luu Pham
*Assistant Examiner* — Baotram Tran
(74) *Attorney, Agent, or Firm* — Ingrassia Fisher & Lorenz, P.C.

(57) ABSTRACT

A system is provided for managing protected data resources. The system includes a resource server configured to store the protected data resources and an authorization module coupled to the resource server and configured to store access protocols. The authorization module further is configured to receive a service request from a user via a client module, evaluate the service request based on the access protocols, and send an access token to the client module if the user satisfies the access protocols.

15 Claims, 6 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233583 A1* | 12/2003 | Carley ............... H04L 63/08 726/3 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0024764 A1* | 2/2004 | Hsu ............... G06F 21/31 1/1 |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0072291 A1* | 3/2008 | Carley ............... G06F 21/71 726/3 |
| 2008/0097998 A1* | 4/2008 | Herbach ............... G06F 9/00 1/1 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0217361 A1* | 8/2009 | Crandell ............... G06F 21/32 726/5 |
| 2009/0222449 A1* | 9/2009 | Hom ............... G06F 21/6218 1/1 |
| 2011/0218958 A1 | 9/2011 | Warshavsky et al. |
| 2011/0247051 A1 | 10/2011 | Bulumulla et al. |
| 2011/0307947 A1* | 12/2011 | Kariv ............... H04L 63/08 726/9 |
| 2012/0011358 A1* | 1/2012 | Masone ............... G06F 21/305 713/153 |
| 2012/0042218 A1 | 2/2012 | Cinarkaya et al. |
| 2012/0144202 A1* | 6/2012 | Counterman ............... G06F 21/335 713/176 |
| 2012/0233137 A1 | 9/2012 | Jakobson et al. |
| 2012/0240214 A1* | 9/2012 | Ogura ............... G06F 21/31 726/12 |
| 2012/0311660 A1* | 12/2012 | Park et al. ............... 726/1 |
| 2013/0007846 A1* | 1/2013 | Murakami ............... H04W 12/08 726/4 |
| 2013/0104200 A1* | 4/2013 | Choi ............... H04L 63/08 726/4 |
| 2013/0139241 A1* | 5/2013 | Leeder ............... H04W 12/06 726/9 |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0268680 A1 * | 10/2013 | Marton ............... H04L 63/0815 709/226 |

OTHER PUBLICATIONS

David J. Lutz, Secure AAA by means of Identity Tokens in Next Generation Mobile Environments, © 2007, IEEE, 6 pages.*
Fritsch et al., User-Controlled Dynamic Access Credential Enrichment for Run-time Service Selection, © 2012, IEEE, 8 pages.*
Ng et al., Designated Group Credentials, © 2006, ACM, 7 pages.*
Tsang et al., Blacklistable Anonymous Credentials: Blocking Misbehaving Users without TTPs, © 2007, ACM, 10 pages.*

* cited by examiner

SYSTEMS AND METHODS FOR ADMINISTRATING ACCESS IN AN ON-DEMAND COMPUTING ENVIRONMENT

CROSS-REFERENCE TO RELATED APPLICATION

This application claims the benefit of U.S. provisional patent application Ser. No. 61/649,540, filed May 21, 2012.

TECHNICAL FIELD

Embodiments of the subject matter described herein generally relate to an on-demand computing environment, such as a multi-tenant database system. More particularly, exemplary embodiments relate to systems and methods for administrating access in an on-demand computing environment.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. The multi-tenant platform operator may make improvements to the platform based upon collective information from the entire tenant community, as well as improving collaboration and integration between applications and the data managed by the various applications. The multi-tenant architecture therefore allows convenient and cost effective sharing of similar application features between multiple sets of users.

In certain situations, it may be necessary or desirable to grant access to secure or protected data. If the "owner" of the protected data resources seeks access, then user credentials may be used (e.g., a username and password). If a "non-owner" of the protected data resources seeks access, then the non-owner may use the owner's credentials to gain access. Alternatively, authorization or authentication techniques or protocols may be employed to provide regulated access to the non-owner. For example, the OAuth authorization protocol may be used such that the owner's credentials need not be disclosed to the non-owner. In this regard, the OAuth authorization protocol calls for the use of access tokens that enable non-owners to access protected data resources without knowledge of the owner's credentials. The scope, duration, and amount of data access enabled by an access token may be configured and controlled as needed to limit, restrict, and/or prevent access to certain data. Unfortunately, the OAuth authorization protocol assumes that the end user is the owner of the data, and as such, only the end user may authorize access. However, if the end user is a member of an organization, the organization may want to place restrictions on, or otherwise administer access to, the protected data.

Accordingly, it is desirable to provide systems and methods for administrating access in an on-demand environment, particularly an environment that uses an OAuth authorization protocol. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Broadly, exemplary embodiments discussed herein provide improved systems and methods for the storage, management, and administration of protected data resources in an on-demand environment, particularly an environment that uses an OAuth authorization protocol. In one exemplary embodiment, the authorization module manages protected data resources stored in a resource server. The authorization module may provide administration capabilities to an administrator. The administrator may use the administration capabilities to establish access protocols associated with the protected data resources. As such, when an end user requests authentication and authorizes a client module to access the protected data resources, the authorization module reviews the access protocols prior to authorization. As such, an administrator may manage access to the protected data resources instead of relying upon end-user authorization. Upon authorization, the authorization module sends an access token to the client module to access the protected data resources from the resource server.

Figure 1:
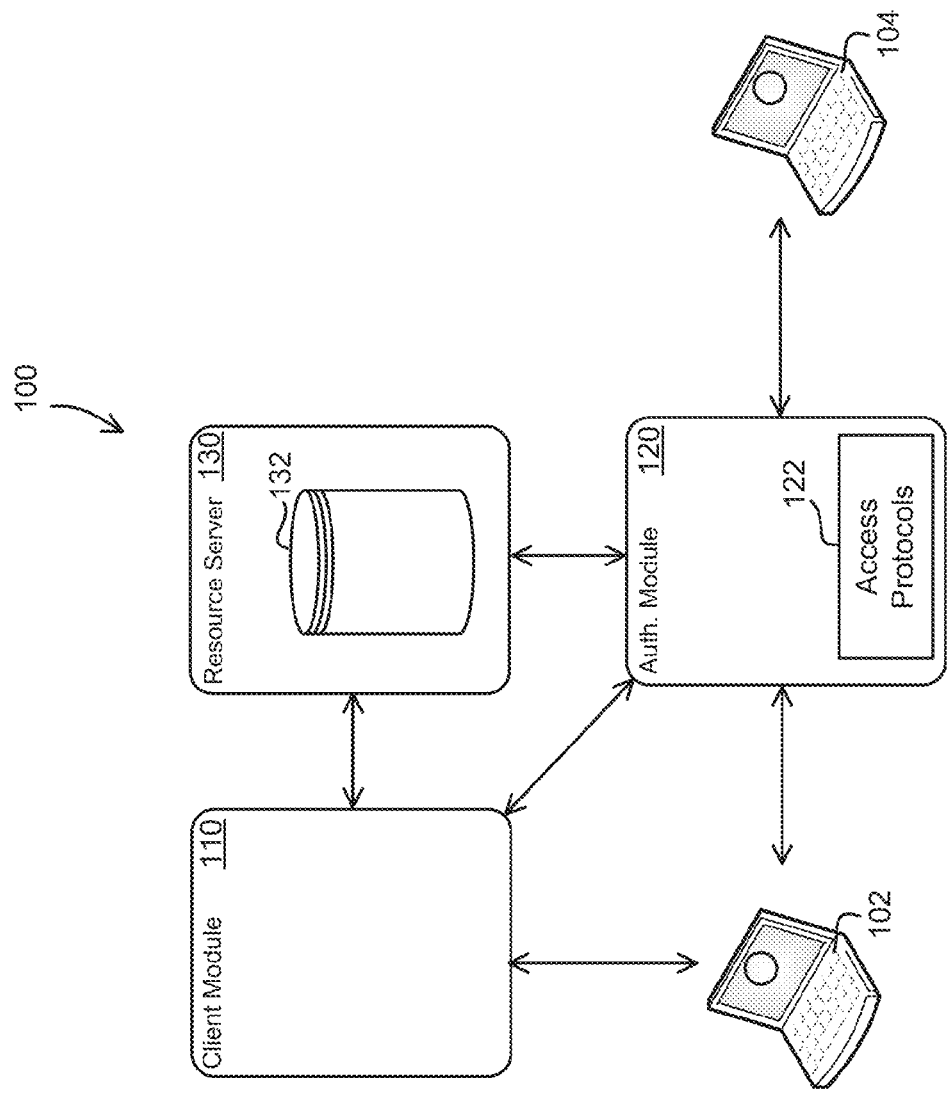
FIG. 1 is an exemplary system for the storage, management, and administration protected data resource in accordance with an exemplary embodiment.

FIG. 1 is a diagram that illustrates an exemplary environment associated with the storage, management, and administration of protected data resources. FIG. 1 depicts a simplified system 100 having a client module 110, an authorization module 120, and a resource server 130. Although not depicted in FIG. 1, the system 100 may be deployed in the context of a multi-tenant application system, such as a system described below with reference to FIG. 6.

FIG. 1 additionally depicts a user device 102 that enables a user to interact with the system 100. In general, a user may be any person desiring access or authorize access to the protected data resources via the client module 110, such as an employee or customer of an organization. Moreover, an administrator device 104 is provided to enable an administrator to interact with the system 100. In general, an administrator may be a person within the organization responsible for establishing access restrictions for the protected data resources stored in the resource server 130. Although FIG. 1 depicts a single user device 102 and single administrator device 104, the system environment may support a number of such devices 102, 104. The devices 102, 104 may be any sort of personal computer, mobile telephone, tablet or other network-enabled user device on a network for accessing the system 100.

FIG. 1 depicts functional units that might be realized using, for example, one or more processors, a data processing engine, or other computer-implemented logic resident in the system 100. In this regard, each of the devices 102, 104, the client module 110, the authorization module 120, and/or the resource server 130 may represent, without limitation: a piece of hardware (such as a computer, a mobile electronic device, or any processor-based computing device); a functional, logical, or processing module of a piece of hardware; a software-based application that executes at a piece of hardware; or the like. In certain embodiments, the units may be realized as one more web-based applications, desktop applications, object-oriented scripts running on webpages, or the like, which are suitably designed to perform the various client module tasks, processes, and procedures described in more detail herein. FIG. 1 depicts only one client module 110 in the system 100. In practice, however, the authorization module 120 and/or the resource server 130 may support a plurality of different client modules. Moreover, although the authorization module 120 and the resource server 130 are depicted as distinct elements, the two could be realized as a single logical element, module, or hardware device. A general description of the devices 102, 104, the client module 110, the authorization module 120 and/or the resource server 130 will be briefly provided prior to a more detailed description with reference to FIGS. 2-5.

In general, the resource server 130 is suitably designed to host the protected data resources. As such, the resource server 130 may include a database 132 to store the protected data resources. The client module 110 may attempt to access the protected data resources in the resource server 130 on behalf of the user via the user device 102. In general, the authorization module 120 may function to manage access to the protected data resources in the resource server 130, for example, by authenticating users and granting access tokens to the client module 110 for accessing the protected data resources, as requested by the user and/or authorized by the organization. As such, an administrator of the system 100 may define access restrictions via administration capabilities of the administrator device 104 that may be stored as access protocols 122. The access protocols 122 may be in any suitable form, such as a data table, that defines rights, privileges, and capabilities associated with the protected data resources.

Accordingly, during operation, the client module 110, in response to a service request from the user device 102, requests access and authentication from the authorization module 120. If the credentials of the user are confirmed and the user is authorized to access the protected data resources according to the access protocols 122, the authorization module 120 issues an access token, which the client module 110 may use to access the data from the resource server 130. As such, the administrator may efficiently manage access to the protected data resources via the access protocols 122.

As noted above, the authorization module 120 and resource server 130 may function as set forth in an authorization protocol to provide access to protected data. In one exemplary embodiment, the authorization protocol is an OAuth 2.0 authorization protocol, generally referenced below as an "OAuth authorization protocol." An example of the OAuth 2.0 authorization protocol may be obtained from, for example, the Internet Engineering Task Force (IETF) and is hereby incorporated by reference.

In general, OAuth authorization protocol enables clients (e.g., client module 110) to access server resources (e.g., in resource server 130) on behalf of a user (e.g., at user device 102) associated with the resource owner (e.g., administrator device 104). As such, the client module 110, the authorization module 120, and the resource server 130 may utilize access tokens that define data access rights, privileges, or capabilities. In particular, the resource server 130 may generate access tokens that define these data access attributes. In this context, the client module 110 may access to protected data without directly using the credentials (e.g., username and password) of the end user.

As used in this description, an "access token" is digital data that represents an authorization issued to an entity, application, module, or element that seeks access to protected data, to access system features, to access system functionality, and the like. Depending upon the particular application, system environment, or context, any of the following terms could be used interchangeably with "access token": "session," "UI session," or "session key." For simplicity, the following description consistently refers to "access token" rather than any of these alternate terms.

In practice, an access token can be realized as a string of bits that defines or otherwise indicates, without limitation: a scope of data access granted to the token holder; a duration of data access granted to the token holder; data access capabilities granted to the token holder; and/or particular system features or functionality accessible to the token holder. The data access attributes associated with an access token may be designated and granted by the owner of the protected resources. Moreover, access tokens may be processed by the client module 110, the authorization module 120, and the resource server 130 as needed to implement the desired data protection schemes. In this regard, the data access attributes corresponding to an access token may be static and fixed, or they may be dynamic and responsive to certain authorization rules or protocols employed by the system. For example, the data access attributes associated with a particular access token may vary in accordance with the date, time, user identity, user classification, system status, system condition, or the like. Additional details about the interaction between the client module 110, the authorization module 120, and the resource server 130 will now be provided.

Figure 2:
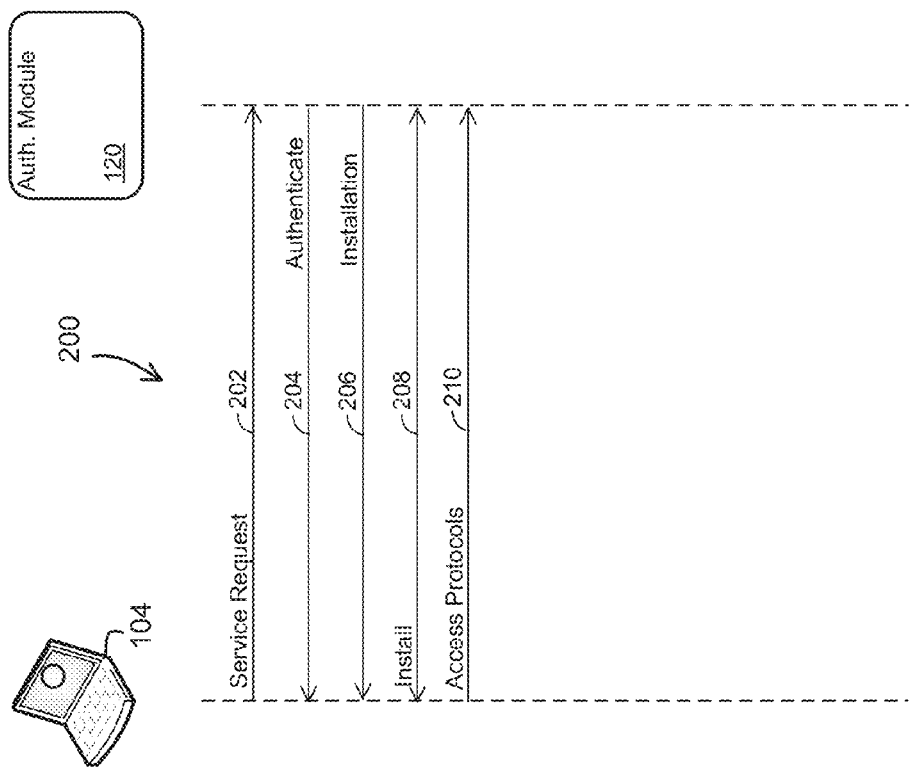
FIG. 2 is a diagram that illustrates data flows associated with the administration of protected data resources in accordance with an exemplary embodiment.

FIG. 2 is a diagram that illustrates data flows 200 associated with the administration of protected data resources in accordance with an exemplary embodiment. The data flows 200 may be associated, for example, with the system 100 described above with reference to FIG. 1. As such, FIGS. 1 and 2 will be referenced below.

In accordance with the exemplary embodiment shown in FIG. 2, the administrator device 104 sends an administration request to the authorization module 120, as indicated by data flow 202. The administration request may include the credentials of the administrator as a legitimate administrator of the system 100. In response and as indicated by data flow 204, the authorization module 120 may evaluate the credentials and, if appropriate, confirm authentication of the administrator. The authorization module 120 may also provide access to administration capabilities to the administrator via the administrator device 104. For example, as indicated by data flow 206, the authorization module 120 may provide an installation location for the administrator device 104. The installation location may be, for example, a URL reference for a program stored on the authorization module 120. In response and as indicated by data flow 208, the administrator, via the administrator device 104, may initiate installation of the administration capabilities. In response and indicated by data flow 210, the administrator device 104 may utilize the administration capabilities to define policy controls as the access protocols 122 associated with the protected data resources in the resource server 130. The policy controls may be any suitable policy control, including the individuals and/or groups that have access to the data from the resource server 130, and if data is accessible, the rights of the individuals and/or groups associated with that access. As noted above, the access protocols 122 are stored in the authorization module 120.

Figure 3:
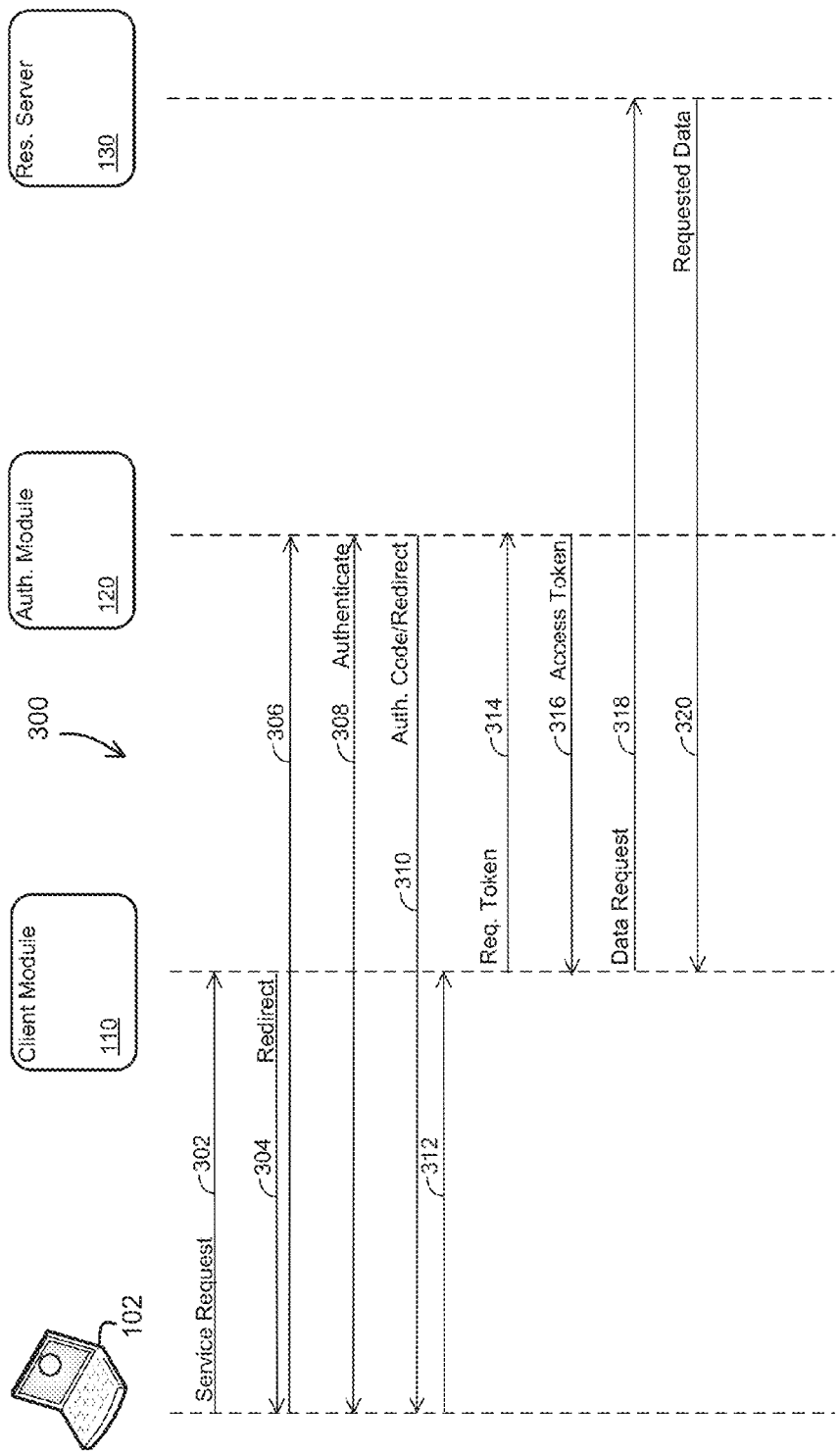
FIG. 3 is a diagram that illustrates data flows associated with the access of protected data resources in accordance with an exemplary embodiment.

FIG. 3 is a diagram that illustrates data flows 300 associated with the access of protected data resources in accordance with an exemplary embodiment. The data flows 300 may be associated, for example, with the system 100 described above with reference to FIG. 1. As such, FIGS. 1 and 3 will be referenced below. Generally, the flows 300 described below may be implemented with the OAuth protocol that uses assertion flows with requests (e.g., POST and GET requests) and various other parameters, commands, and instructions as defined therein. Moreover, the data flows 300 typically occur after the generation of the access protocols 122 discussed above.

In accordance with the exemplary embodiment shown in FIG. 3, the user, via user device 102, generates and sends a service request to the client module 110, as indicated by data flow 302. Typically, the service request may include a data request to access a portion of the protected data resources stored in the resource server 130 of the system 100.

In response and as indicated by data flows 304 and 306, the client module 110 redirects the user device 102 to the authorization module 120. The redirect exchange may include an identifier associated with the client module 110.

As indicated by data flow 308, the authorization module 120 authenticates the user, for example, by requesting and receiving user credentials. The credentials may include a username and password requested by the authorization module 120 from the user device 102. In some exemplary embodiments, the authorization module 120 requests confirmation from the user via the user device 102 that the user is attempting to grant the client module 110 access to the protected data resources. In this manner and in accordance with the OAuth protocol, the client module 110 does not receive the user credentials.

The authorization module 120 additionally evaluates the user and the data request in view of the access protocols 122 stored in the authorization module 120. As noted above, the access protocols 122 are generally a set of conditions or policy restrictions for accessing the protected data resources, such as a list of users or groups of users that may access the protected data resources. For example, the authorization module 120 may determine that the access protocols 122 restrict all access to the protected data resources. In such situations, the authorization module 120 informs the user device 102 that the requested data resources are inaccessible by the user. Similarly, the authorization module 120 may determine that the protected data resources are only accessible to certain users. As such, the authorization module 120 compares the user credentials to the list of acceptable users. If the user is not acceptable, the authorization module 120 informs the client module 110 and the user device 102 that the requested data resources are inaccessible to the user. However, if the user satisfies the access protocols 122, the authorization module 120 authorizes the user. In this manner, the access protocols 122 dictate access to the restricted data resources instead of the user. In conventional systems that utilize OAuth authorization protocols, the user provides authorization for the client module to access the protected data resources.

As indicated by data flows 310 and 312, upon authorization, the authorization module 120 sends an authorization code to the user device 102 and redirects the user device 102 to the client module 110. The client module 110 extracts the authorization code and sends a token request to the authorization module 120, as indicated by data flow 314.

In response, the authorization module 120 generates an access token based on the token request and the authorization code and provides the access token to the client module 110, as indicated by data flow 316. As noted above, the access token indicates to the resource server 130 that the client module 110 has access to the protected data resources. The access token may also indicate the limitations of that access, such as duration.

As indicated by data flows 318 and 320, the client module 110 then sends a data request to the resource server 130 with the access token, and in turn, the resource server 130 sends the client module 110 the requested data based on the access token. In general, the client module 110 may send additional data requests within the scope of the access token until the access token expires. The client 110 may then use the data as authorized by the user.

Figure 4:
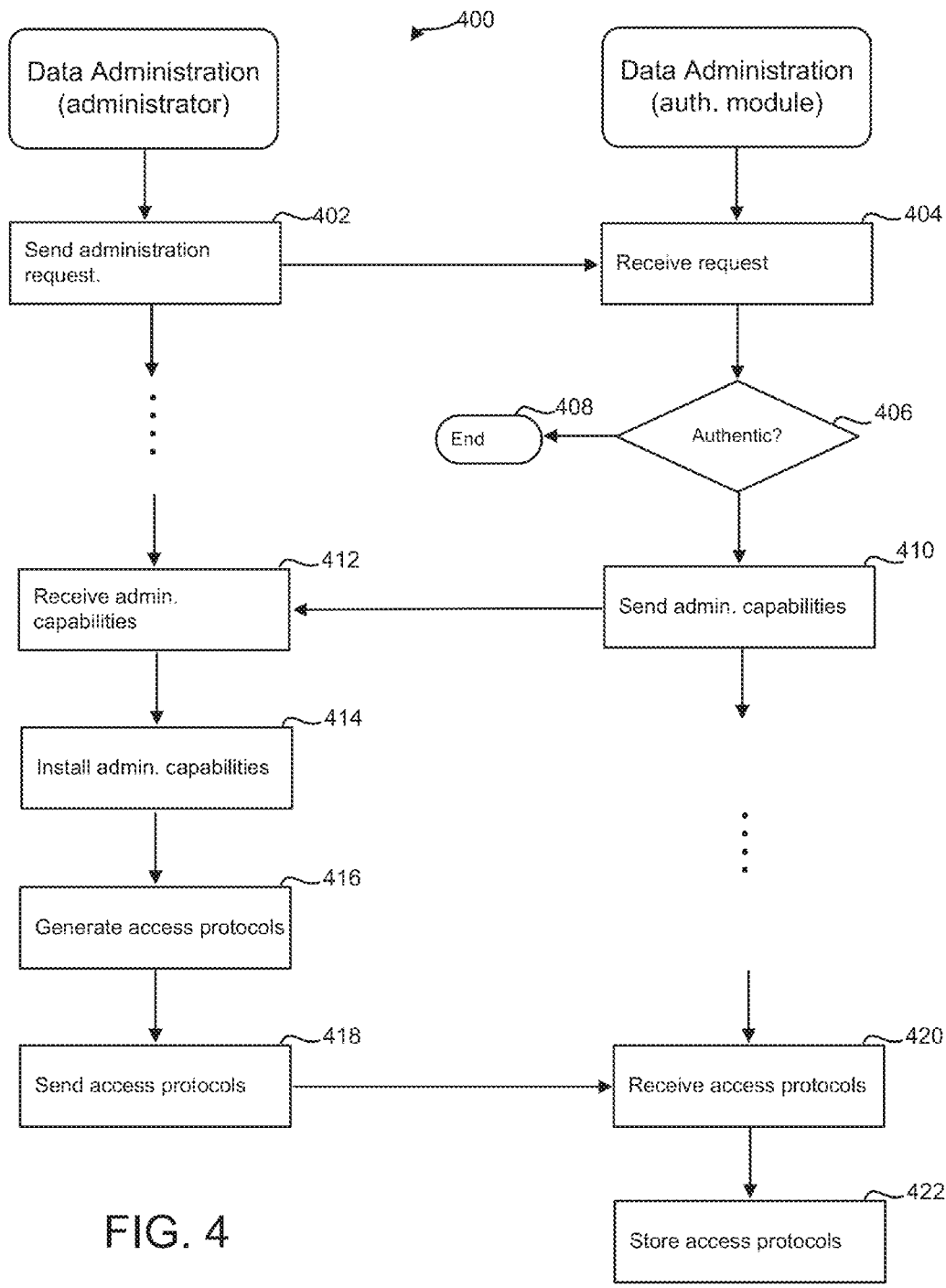
FIG. 4 is a flow chart that illustrates an exemplary embodiment of an administration process for protected data resources in accordance with an exemplary embodiment.

FIG. 4 is a flow chart that illustrates an exemplary embodiment of a data administration process 400. The various tasks performed in connection with the process 400 may be performed by software, hardware, firmware, or any combination thereof. For illustrative purposes, the following description of the process 400 may refer to elements mentioned above in connection with FIG. 1. As such, FIGS. 1 and 4 are referenced below.

It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For this particular embodiment, certain tasks of the process 400 are performed by an administrator device, such as the administrator device 104 discussed above, while other tasks are performed by an authorization module, such as the authorization module 120 discussed above. Accordingly, the left side of FIG. 4 corresponds to tasks performed by the administrator device 104, and the right side of FIG. 4 corresponds to tasks performed by the authorization module 120.

The process 400 assumes that the administrator device 104 desires to manage or otherwise regulate access to protected data resources. To this end, the administrator device 104 may generate and send a suitable formatted populated administration request, as indicated by step 402. In certain embodiments, the administration request also includes or is generated with credentials of the administrator that facilitate authentication of the administrator device 104.

In steps 404 and 406, the authorization module 120 receives the administration request and evaluates the administrator credentials. In step 406, if the administration request is denied, the authorization module 120 terminates the process, as indicated by step 408. However, if the administration request is accepted, the authorization module 120 generates and sends a response, including access to administration capabilities, as indicated by step 410. For example, the authorization module 120 may provide an installation location to the administrator device 104. The installation location may be, for example, a URL reference for a program stored on the authorization module 120.

In steps 412 and 414, the administrator device 104 receives and installs the administration capabilities. In steps 416 and 418, the administrator generates the access protocols using the administration capabilities and sends the access protocols to the authorization module 120. In steps 420 and 422, the authorization module 120 receives and stores the policy controls as access protocols 122.

Figure 5:
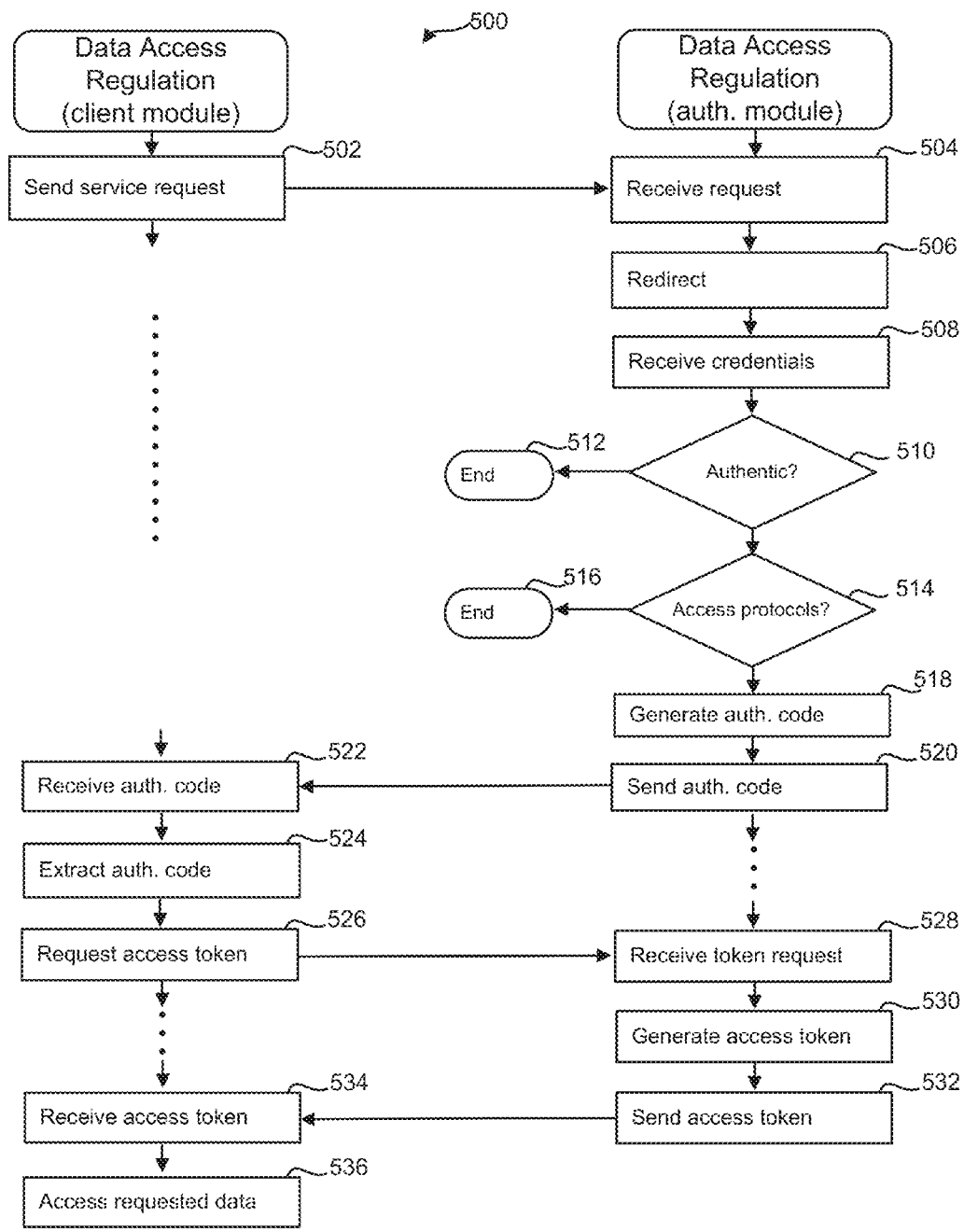
FIG. 5 is a flow chart that illustrates an exemplary embodiment of an access regulation process for protected data resources in accordance with an exemplary embodiment.

FIG. 5 is a flow chart that illustrates an exemplary embodiment of a data access regulation process 500. The various tasks performed in connection with the process 500 may be performed by software, hardware, firmware, or any combination thereof. For illustrative purposes, the following description of the process 500 may refer to elements mentioned above in connection with FIG. 1. As such, FIGS. 1 and 5 are referenced below. Generally, the process 500 occurs after generation of the access protocols 122 described above.

It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

For this particular embodiment, certain tasks of the process 500 are performed by a client module, such as the client module 110 discussed above, while other tasks are performed by an authorization module, such as the authorization module 120 discussed above. Accordingly, the left side of FIG. 5 corresponds to tasks performed by the client module 110, and the right side of FIG. 5 corresponds to tasks performed by the authorization module 120.

The process 500 assumes that the client module 110 received an access or service request from a user device, such as user device 102, to access a portion of the protected data resources. In step 502, the client module 110 generates and sends an authorization request to the authorization module 120.

In steps 504 and 506, the authorization module 120 receives the request and redirects the user device 102. In step 510, the authorization module 120 receives and evaluates the credentials of the client module 110. In step 506, if the authorization request is denied, the authorization module 120 terminates the process, as indicated by step 512.

Assuming the credentials of the user are authenticated, in step 514, the authorization module 120 evaluates the user and the data request in view of the access protocols 122 stored in the authorization module 120. If the authorization module 120 determines that the access protocols 122 restrict the user from accessing the requested data, the authorization module 120 terminates the process 500, as indicated by step 516. However, if the access protocols 122 indicate that the user has access to the protected data resources, the authorization module 120 generates and sends an authorization code, which is provided to the client module 110, as indicated by steps 518 and 520.

In steps 522 and 524, the client module 110 receives and extracts the authorization code, and in step 526, the client module 110 requests an access token from the authorization module 120. In steps 528, 530, and 532, the authorization module 120 receives the token request, generates the access token, and sends the access token to the client module 110. In steps 534 and 536, the client module 110 receives the access token and subsequently accesses the requested data from the resource server 130 with the access token.

Figure 6:
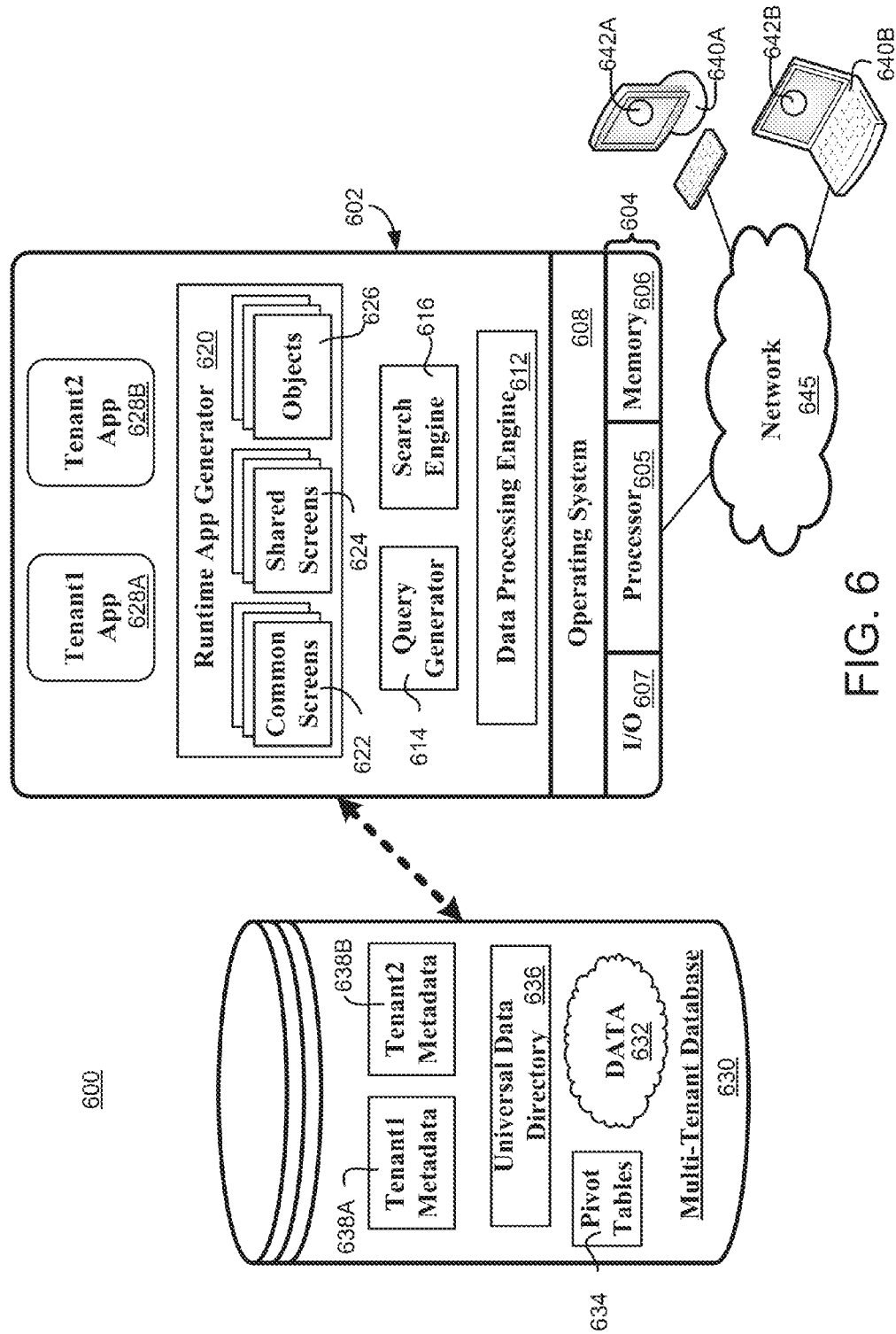
FIG. 6 is a block diagram of an exemplary multi-tenant data processing environment associated with the system of FIG. 1 in accordance with an exemplary embodiment.

In some exemplary embodiments, the systems and methods described above may be implemented in a multi-tenant application system, such as the multi-tenant application system 600 illustrated in FIG. 6. Referring to FIG. 6, an exemplary multi-tenant application system 600 suitably includes a server 602 that dynamically creates virtual applications 628A-B based upon data 632 from a common database 630 that is shared between multiple tenants. As an example, the database 630 may store the protected data resources discussed above. Data and services generated by the virtual applications 628A-B are provided via network 645 to any number of client devices 640A-B, as desired. Each virtual application 628A-B is suitably generated at run-time using a common platform 610 that securely provides access to data 632 in database 630 for each of the various tenants subscribing to system 600. As examples, the virtual applications 628A-B may correspond to one or more of the modules 110, 120 and servers 130 discussed above, and devices 640A-B may correspond to one or more of the devices 102, 104 discussed above.

A "tenant" or "organization" generally refers to a group of users that shares access to common data within database 630. Tenants may represent customers, customer departments, business or legal organizations, and/or any other entities that maintain data for particular sets of users within system 600. Using the examples above, a tenant may be a group that enables end users to access protected data resources via a client module. Although multiple tenants may share access to a common server 602 and database 630, the particular data and services provided from server 602 to each tenant can be securely isolated from those provided to other tenants, as described more fully below. The multi-tenant architecture therefore allows different sets of users to share functionality without necessarily sharing each other's data 632.

Database 630 is any sort of repository or other data storage system capable of storing and managing data 632 associated with any number of tenants. Database 630 may be implemented using any type of conventional database server hardware. In various embodiments, database 630 shares processing hardware 604 with server 602. In other embodiments, database 630 is implemented using separate physical and/or virtual database server hardware that communicates with server 602 to perform the various functions described herein.

Data 632 may be organized and formatted in any manner to support multi-tenant application platform 610. In various embodiments, data 632 is suitably organized into a relatively small number of large data tables to maintain a semi-amorphous "heap"—type format. Data 632 can then be organized as needed for a particular virtual application 628A-B. In various embodiments, conventional data relationships are established using any number of pivot tables 634 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638A-B for each tenant, as desired. Rather than forcing data 632 into an inflexible global structure that is common to all tenants and applications, then, database 630 is organized to be relatively amorphous, with tables 634 and metadata 636-638 providing additional structure on an as-needed basis. To that end, application platform 610 suitably uses tables 634 and/or metadata 636, 638 to generate "virtual" components of applications 628A-B to logically obtain, process, and present the relatively amorphous data 632 from database 630.

Server 602 is implemented using one or more actual and/or virtual computing systems that collectively provide a dynamic application platform 610 for generating virtual applications 628A-B. Server 602 operates with any sort of conventional computing hardware 604, such as any processor 605, memory 606, input/output features 607 and the like. Processor 605 may be implemented using one or more of microprocessors, microcontrol modules, processing cores and/or other computing resources spread across any number of distributed or integrated systems, including any number of "cloud-based" or other virtual systems. Memory 606 represents any non-transitory short or long term storage capable of storing programming instructions for execution on processor 605, including any sort of random access memory (RAM), read only memory (ROM), flash memory, magnetic or optical mass storage, and/or the like. Input/output features 607 represent conventional interfaces to networks (e.g., to network 645, or any other local area, wide area or other network), mass storage, display devices, data entry devices and/or the like. In a typical embodiment, application platform 610 gains access to processing resources, communications interfaces and other features of hardware 604 using any sort of conventional or proprietary operating system 608. As noted above, server 602 may be implemented using a cluster of actual and/or virtual servers operating in conjunction with each other, typically in association with conventional network communications, cluster management, load balancing and other features as appropriate.

Application platform 610 is any sort of software application or other data processing engine that generates virtual applications 628A-B that provide data and/or services to client devices 640A-B. Virtual applications 628A-B are typically generated at run-time in response to queries received from client devices 640A-B, as described more fully below. In the example illustrated in FIG. 6, application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

Runtime application generator 620 dynamically builds and executes virtual applications 628A-B in response to specific requests received from client devices 640A-B. Virtual applications 628A-B created by tenants are typically constructed in accordance with tenant-specific metadata 638, which describes the particular tables, reports, interfaces and/or other features of the particular application. In various embodiments, each virtual application 628A-B generates dynamic web content that can be served to a browser or other client program 642A-B associated with client device 640A-B, as appropriate. Data processing engine 612 performs bulk processing operations on data 632 such as uploads or downloads, updates, online transaction processing and/or the like.

In operation, then, developers use application platform 610 to create data-driven virtual applications 628A-B for the tenants that they support. Such applications 628A-B may make use of interface features such as tenant-specific screens 624, universal screens 622 or the like. Any number of tenant-specific and/or universal objects 626 may also be available for integration into tenant-developed applications 628A-B. Data 632 associated with each application 628A-B is provided to database 630, as appropriate, and stored until requested, along with metadata 638 that describes the particular features (e.g., reports, tables, functions, etc.) of tenant-specific application 628A-B until needed.

Data and services provided by server 602 can be retrieved using any sort of personal computer, mobile telephone, tablet or other network-enabled client device 640 on network 645. Typically, the user operates a conventional browser or other client program 642 to contact server 602 via network 645 using, for example, the hypertext transport protocol (HTTP) or the like. The user typically authenticates his or her identity to the server 602 to obtain a session identification ("SessionID") that identifies the user in subsequent communications with server 602. When the identified user requests access to a virtual application 628, application generator 620 suitably creates the application at run time based upon metadata 636 and 638, as appropriate. Query generator 614 suitably obtains the requested data 632 from database 630 as needed to populate the tables, reports or other features of virtual application 628. As noted above, the virtual application 628 may contain Java, ActiveX or other content that can be presented using conventional client software 642 running on client device 640; other embodiments may simply provide dynamic web or other content that can be presented and viewed by the user, as desired Generally speaking, the various functions and features described above may be carried out with any sort of hardware, software and/or firmware logic that is stored and/or executed on any platform. Some or all aspects of exemplary embodiments may be carried out, for example, by logic executing within platform 610 in FIG. 6, for example, using software or firmware logic that is stored in memory and executed by processor as part of application platform. The particular hardware, software and/or firmware logic may vary from context to context, implementation to implementation, and embodiment to embodiment in accordance with the various features, structures and environments set forth herein. The particular means used to implement each of the various functions may be any sort of processing structures that are capable of executing software and/or firmware logic in any format, and/or any sort of application-specific or general purpose hardware, including any sort of discrete and/or integrated circuitry.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-6 depicts exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for managing protected data resources, comprising:
   a resource server configured to store the protected data resources; and
   an authorization module coupled to the resource server and configured to store access protocols,
      the authorization module further configured to receive a service request from a user via a client module, the service request including user credentials,
      the authorization module further configured to evaluate the user credentials to determine when the service request is from a legitimate user, and
      wherein, when the authorization module determines that the user credentials are acceptable, the authorization module is configured to evaluate the service request based on the access protocols and send an authorization code to the user based on the access protocols,
      the authorization module further configured to receive a token request with the authorization code from the user via the client module and to send an access token to the client module based on the authorization code for accessing the protected data resources of the resource server,
   wherein the authorization module is configured to receive an administration request from an administrator device, the administration request including administrator credentials,
      the authorization module configured to evaluate the administrator credentials to determine when the administration request is from a legitimate administrator and,
      wherein, when the authorization module determines that the administrator credentials are acceptable, the authorization module is configured to provide a location reference for an administration program stored on the authorization module to the administrator device based on the administrator credentials such that, upon execution of the administration program, administration capabilities from the administration program are installed on the administrator device, and
   wherein the authorization module is configured to receive and store the access protocols from the administrator device generated with the administration capabilities, the access protocols comprising a data table that defines rights associated with the protected data resources for a list of users or groups.

2. The system of claim 1, wherein the authorization module is configured to receive and store the access protocols from the administrator device generated with the administration capabilities.

3. The system of claim 1, wherein the resource server is configured to receive the service request and the access token from a user device.

4. The system of claim 3, wherein the resource server is configured to provide the protected data resources to the client module according to the service request and the access token.

5. The system of claim 1, wherein the resource server is a database of a multi-tenant database system.

6. The system of claim 1, wherein the access token is an access token according to an OAuth 2.0 authorization protocol.

7. A computer-implemented method of regulating access to protected data resources, the method comprising:
  receiving a service request at an authorization module from a user via a client module to access the protected data resources stored in a resource server, the service request including user credentials;
  evaluating the user credentials to determine when the service request is from a legitimate user;
  evaluating, when determining that the user credentials are acceptable, the service request with the authorization module based on access protocols;
  sending an authorization code to the user based on the access protocols;
  receiving a token request with the authorization code from the user via the client module;
  sending an access token to the client module to access the protected data resources; and
  receiving an administration request at the authorization module from an administrator device and providing administration capabilities to the administrator device, the administration request including administrator credentials,
  evaluating the administrator credentials to determine when the administration request is from a legitimate administrator;
  providing, when the authorization module determines that the administrator credentials are acceptable, a location reference for an administration program stored on the authorization module to the administrator device based on the administrator credentials such that, upon execution of the administration program, administration capabilities from the administration program are installed on the administrator device.

8. The method of claim 7, further comprising the step of receiving and storing the access protocols from the administrator device generated with the administration capabilities.

9. The method of claim 7, further comprising the step of receiving the service request and the access token at the resource server from a user device.

10. The method of claim 9, further comprising the step of providing the protected data resources to the client module according to the service request and the access token.

11. The method of claim 7, wherein the resource server is a database of a multi-tenant database system.

12. The method of claim 7, wherein the access token is an access token according to an OAuth 2.0 authorization protocol.

13. A system comprising a processor and a memory, wherein the memory comprises computer-executable instructions that, when executed by the processor, cause the system to:
  receive a service request from a user via a client module, the service request including user credentials,
  evaluate the user credentials to determine when the service request is from a legitimate user;
  evaluate, when determining that the user credentials are acceptable, the service request based on the access protocols, and
  send an authorization code to the user based on the access protocols,
  receive a token request with the authorization code from the user via the client module;
  send an access token to the client module to access the protected data resources,
  wherein the instructions additionally cause the system to
  receive an administration request at the authorization module from an administrator device, the administration request including administrator credentials,
  evaluate the administrator credentials to determine when the administration request is from a legitimate administrator;
  provide, when the authorization module determines that the administrator credentials are acceptable, a location reference for an administration program stored on the authorization module such that upon execution of the administration program, administration capabilities are installed on the administrator device, and
  store the access protocols from the administrator device generated with the administration capabilities.

14. The system of claim 13, wherein the instructions additionally cause the system to provide the protected data resources to the client module according to the service request and the access token.

15. The system of claim 13, wherein the access token is an access token according to an OAuth 2.0 authorization protocol.

* * * * *